Nov. 29, 1932.  J. MERCIER  1,888,998
PROCESS FOR THE SYNTHESIS OF HYDROCARBON FUELS, AND FOR
THE CRACKING AND HYDROGENATION OF HEAVY HYDROCARBONS
Filed May 23, 1929
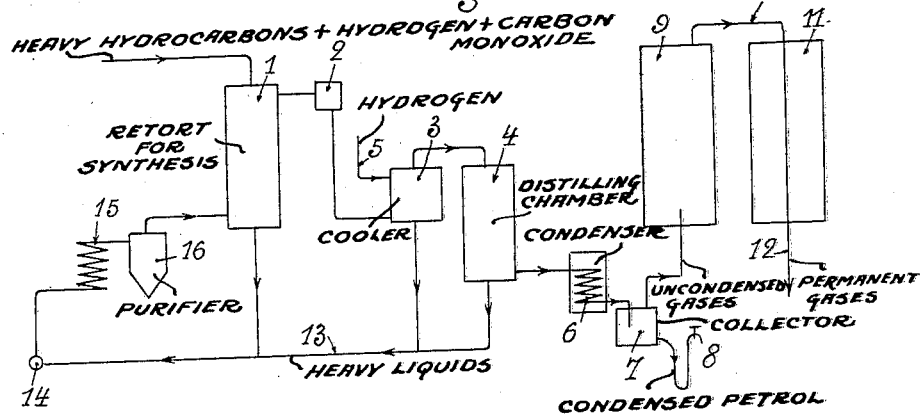
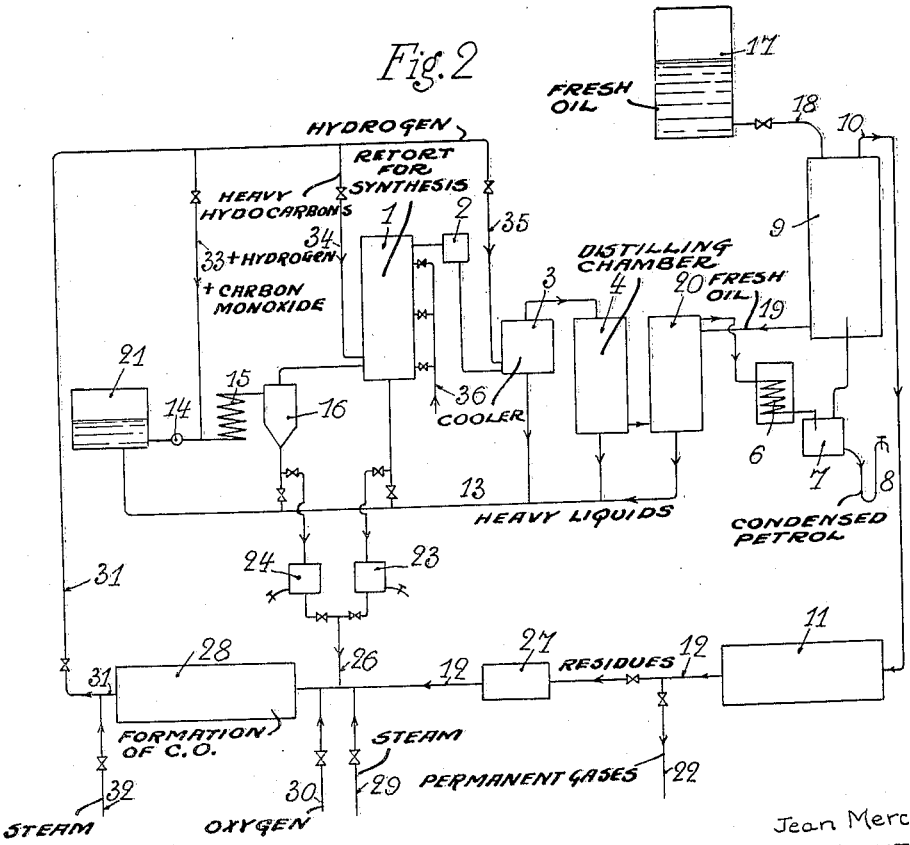
Jean Mercier
INVENTOR;

Patented Nov. 29, 1932

1,888,998

UNITED STATES PATENT OFFICE

JEAN MERCIER, OF PARIS, FRANCE

PROCESS FOR THE SYNTHESIS OF HYDROCARBON FUELS, AND FOR THE CRACKING AND HYDROGENATION OF HEAVY HYDROCARBONS

Application filed May 23, 1929, Serial No. 365,322, and in Belgium June 2, 1928.

The present invention relates to improvements in processes for the synthesis of hydrocarbons which chiefly consist in the heating of a mixture of carbon monoxide and hydrogen in the presence of catalysts at a temperature of about 500° C. and in then subjecting the said gases to a simultaneous expansion and cooling of a sudden and energetic nature, in such manner as to cool them without transition to a temperature between 180° and 300° C., again in the presence of catalysts.

If desired, the initial mixture may also contain steam and this at a temperature of 500° C. will produce nascent hydrogen whose presence furthers the synthesis of the hydrocarbons during the operation.

According to another improvement, the said process is combined with a cycle of cracking or depolymerization, by pyrogenation or other physical or chemical process, of the resulting hydrocarbons, and optionally of other heavy hydrocarbons which are introduced into the cycle.

Further improvements will be specified in the following description.

In the accompanying drawing which is given solely by way of example:

Fig. 1 is a diagram showing the process for the synthesis of hydrocarbons, comprising the improvements according to the invention.

Fig. 2 is a diagram showing the combination of said synthetic process with a cracking cycle.

In the form of construction herein represented, the mixture of carbon monoxide and hydrogen, supplied for instance by an independent source of water gas, is admitted into the retort 1, in which the synthesis of the hydrocarbons takes place. The said retort is maintained at about 500° C. and contains the necessary catalysts, which may be the same as are used in the processes for the cracking of hydrocarbons. The catalyst may consist chiefly of metals of the iron group, (iron, nickel, cobalt and the like), in grains, cutting chips or in powder, which may be disposed on refractory carriers consisting of oxides such as alumina, lime, magnesia, etc. Certain sulphides such as sulphide of iron, molybdenum, tungsten, etc. can also be used as catalysts.

The resulting hydrocarbons are not slowly cooled, but after they may have been purified in a purifier 2 which may be a column through which the vapours are circulated over a purifying mass such as CaO for instance, said gases are abruptly expanded in the dephlegmator 3. This dephlegmator may be of any suitable kind and can for instance comprise a large heat-conducting surface, and thus the hydrocarbons are cooled suddenly to a temperature between 180° and 300° C.

After the said dephlegmator 3 the plant comprises a vertical container 4 containing a catalyst in the shape of finely divided metal or the like, and the capacity of the dephlegmator 3 and the distilling chamber 4 should be such that the hydrocarbons and the gases not yet entirely stabilized and loosened by the sudden expansion and cooling will remain therein for a certain time.

An additional charge of hydrogen can be advantageously introduced in either of the apparatus 3, 4, 5. It is a known fact that the temperatures between 180° and 300° C. are quite favorable to a moderate hydrogenizing of unstable hydrocarbons. This increases the output of the plant and improves the quality of the hydrocarbon fuel manufactured.

Low pressures further the formation of synthetic hydrocarbons analogous to petrol. On the contrary, the high pressures further the formation of hydroxides of carbon. The presence of finely divided metals or other catalysts accelerates the reactions.

The resulting hydrocarbon fuel is circulated into the condenser 6, from which it descends into the collecting chamber 7. The condensed petrol is withdrawn at 8. The uncondensed gases which are saturated with petrol rise through the bubble plate-tower 9, whence they descend through the tube 10 to the petrol removal chamber 11. The permanent gases issue therefrom through the pipe 12.

As concerns the heavy liquid hydrocarbons issuing from the circulation, these may be again introduced through the pipe 13, by means of the pump 14, and they may be sent through the heating worm 15 and the evaporating purifier 16.

The heavy hydrocarbons thus introduced into the circulation are subjected in the retort 1 to the cracking operation by pyrogenation, and the cracking is furthered by the temperature of the retort (about 500° C.) and by the above-mentioned catalysts which it contains.

If water vapour is added to the initial gas mixture, the following secondary reaction will take place:

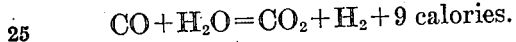

$$CO + H_2O = CO_2 + H_2 + 9 \text{ calories.}$$

The resulting nascent hydrogen furthers the production of light hydrocarbons analogous to petrol, whereby the output of the operation will be increased.

Moreover, the presence of such nascent hydrogen offers a considerable advantage. It is known in fact that in all the methods for the cracking of heavy hydrocarbons, the following residues are formed together with the petrol, that is, carbon and very heavy hydrocarbons, light and unstable hydrocarbons which are coloured and have a bad odour, and gaseous hydrocarbons rich in hydrogen.

To counteract the deposit of carbon and the formation of the unstable liquids, the cracking must be performed in the presence of hydrogen.

The invention further consists in combining the aforesaid synthetic process employing a mixture of carbon monoxide, hydrogen and steam, with any suitable process for the cracking of heavy hydrocarbons, and this permits of not only the production of light hydrocarbons by synthesis and by cracking, but also of greatly increased output of the cracking operation by the energetic action of the nascent hydrogen upon the hydrocarbons during their molecular transformation.

It will be further observed that the reaction which produces the nascent hydrogen is somewhat exothermic, as above indicated, which is a favorable circumstance, and moreover, it can readily take place at temperatures near those of the cracking by pyrogenation, and especially in the presence of catalysts which may be the same as those in use for the cracking and for the synthesis of hydrocarbons.

Moreover, the applicant has found that carbon monoxide increases and prolongs for a long time the catalytic activity of various metals, especially of the iron group.

In practice, it will thus be sufficient to introduce into the retort of a plant adapted for the synthesis of hydrocarbons or for cracking by pyrogenation, or for both these operations, a mixture of steam and carbon monoxide in the proper proportions, in order to obtain the desired result. The gases thus produced in the presence of the hydrocarbons engaged in the cracking operation will combine with these latter, thus forming a somewhat oxidized hydrocarbon and producing a very slightly oxidizing atmosphere. The deposits of carbon which usually clog up the cracking apparatus are herein much reduced, so that the plant can be continuously operated for a long period, which would be otherwise impossible.

The finely divided metals or other catalysts which further the cracking operation may thus be used without being rapidly covered with a deposit of carbon by which their activity would be destroyed.

It should be observed that the best catalysts are those which either alone or when mixed together will further the formation of the nascent hydrogen and at the same time the molecular decomposition of the hydrocarbons and the moderate hydrogenizing whereby the formation of permanent gases will be obviated. The catalysts above mentioned relatively to the synthesis of hydrocarbons may be herein employed to advantage.

The aforesaid reaction of the carbon monoxide upon the steam is effected without variation of volume, and it will take place during cracking operations effected either in liquid or vapour state. On the contrary, the hydrogenizing is furthered by the pressure.

Fig. 2 represents a plant adapted for an improved cycle of cracking operations according to the invention, combined with a cycle for the synthesis of the hydrocarbons shown in Fig. 1.

In the present example, the fresh oil at 17 consisting of heavy hydrocarbons is supplied by the pipe 18 to the vertical bubble plate tower 9 adapted for the summary removal of petrol or gasoline, and it then descends through the pipe 19 to a sulphur-removing and classing chamber 20 containing metals such as iron and copper. The oil then circulates through the general pipe 13 into the mixing tank 21, whence it is circulated by the pump 14 into the heating worm 15. The substances which are still liquid are removed by the separating purifier 16, from which the vapour proceeds into the bottom of the retort 1. The hydrogenation by the nascent hydrogen may commence in the worm 15, being then completed in the said cracking retort 1. The substances resulting from the cracking and the hydrogenation are discharged at the top of the retort and traverse the purifier 2, the said substances absorbing the carbon dioxide. However said purifier may be dispensed with.

As above mentioned, the liquid is then abruptly expanded, and for this purpose the temperature is suddenly reduced in the chambers 3 and 4.

When issuing from the said chambers, the slightly oxidized carburant is circulated in the manner above indicated, but it rises through the separating chamber 20 in which it heats the oil employed in the first place.

The said plant is completed by a cycle for the production of the carbon monoxide employed in the process.

In the example herein represented, the carbon monoxide is formed by the high temperature reaction (at 800°–1,100° C.) of the excess of steam upon the whole or a part of the solid, liquid or gaseous residues of the cracking or of the synthesis of the hydrocarbons.

For this purpose, the said residues from the purifier 16 or from the retort 1, are brought together in the two recipients 23 and 24. A cock 26 provides for the circulation of the said residues into the conduits 12 connected to the petrol-removal chamber 11, which admits the aforesaid permanent gases. The excess of the said gases may issue from the circulation through the pipe 22. A purifying device 27 interposed in the piping 12 serves to remove the carbon monoxide from the permanent gases, which latter are returned to the circuit during the formation of the carbon monoxide. This gas is formed in the chamber 28 into which are introduced the residues of the cracking operation, the permanent gases, the steam admitted into the circuit at 29, and optionally oxygen entering at 30.

The following reaction takes place at the aforesaid temperature:

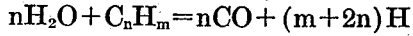
$$nH_2O + C_nH_m = nCO + (m+2n)H$$

which corresponds to the production of a certain quantity of hydrogen which is employed for the synthetic manufacture of hydrocarbons.

The gas mixture due to this reaction is circulated into the pipe 31, to which steam is added at 32, and hence a mixture of $H_2O + CO + H_2$ may be supplied at will, through the pipes 33, 34, 35, to the said heating worm 15, to the retort 1, or to the dephlegmator 3, and preferably before cooling, for the purpose of using the heat carried by said mixture for bringing the reagents contained within the retort 1 to the desired temperature.

Obviously, the invention is not limited to this method for the formation of carbon monoxide, and this gas may also be produced by the incomplete combustion of a part of the residues of the high temperature cracking with the optional use of steam.

If a local combustion at a very high temperature is assured, the carbon monoxide can be produced even in the cracking retort 1, by supplying through the pipe 36 small quantities of oxygen or even of air at a sufficiently high temperature, upon porous refractory material. This surface combustion at a very high temperature is quite suitable for the purpose. The amount of heat to be furnished by an external heating of the retort in order to effect the cracking will be reduced or even replaced by the amount of heat furnished by the gases and steam supplied through 34 at a very high temperature or produced by the local combustion and the various exothermic reactions above mentioned.

Obviously, the invention is not limited to the forms of construction herein described and represented, which are given solely by way of example.

In particular, the invention comprises the case in which the cracking cycle consists solely of a step for the pyrogenation of heavy hydrocarbons, followed by a cooling or purifying of any kind. Herein, the invention consists in performing the said pyrogenation in the presence of a mixture of carbon monoxide and steam, which produces nascent hydrogen in the above-mentioned conditions.

Having now described my invention what I claim as new and desire to secure by Letters Patent is:

1. In a process for the manufacture of light hydrocarbons the continuous steps of effecting the synthesis of hydrocarbons by heating to about 500° C. in the presence of hydrogenizing catalysts an initial mixture including heavy hydrocarbons, carbon monoxide and hydrogen, then subjecting the whole heated mixture to a simultaneous expansion and cooling down to 180–300° C. in a most sudden, rapid and energetic way in order to prevent thus the mixture from staying a relatively long time at any intermediate temperature and immediately after said cooling hydrogenizing said mixture in presence of hydrogenizing catalysts at a temperature between 180° and 300° C.

2. In a process as claimed in claim 1, the further step of admixing steam with the initial mixture at any desired moment of the operation.

3. In a process as claimed in claim 1, the further step of admixing steam with the initial mixture just before the hydrogenizing step at 180–300° C., the heated mixture being already at least partially cooled and expanded.

4. In a process as claimed in claim 1, the further step of admixing carbon monoxide, hydrogen and steam with the initial mixture just before the hydrogenizing step at 180–300° C., the heated mixture being already at least partially cooled and expanded.

5. In a process as claimed in claim 1, carrying the heating and the expanding and cooling steps in the presence of finely divided metals of the iron group.

6. In a process as claimed in claim 1, separately heating to a high degree the substances to be admixed with the heavy hydrocarbons in order to form the initial mixture, so as to heat said heavy hydrocarbons by mixing them with said highly heated substances.

7. In a process as claimed in claim 1, causing a moderate oxidation of a fraction of the hydrocarbons to take place during the heating step.

In testimony whereof I have signed my name to this specification.

JEAN MERCIER.